United States Patent [19]

Abt et al.

[11] Patent Number: 4,700,232

[45] Date of Patent: Oct. 13, 1987

[54] INTERPOLATOR FOR TELEVISION SPECIAL EFFECTS SYSTEM

[75] Inventors: John Abt; Richard A. Jackson, both of Nevada City, Calif.

[73] Assignee: Grass Valley Group, Inc., Grass Valley, Calif.

[21] Appl. No.: 922,601

[22] Filed: Oct. 24, 1986

[51] Int. Cl.[4] ..................... H04N 5/272; H04N 5/262
[52] U.S. Cl. ..................................... 358/183; 358/22; 358/105; 358/136
[58] Field of Search ................. 358/183, 186, 182, 22, 358/105, 135, 136

[56] References Cited

U.S. PATENT DOCUMENTS

| | | | |
|---|---|---|---|
| 3,715,483 | 2/1973 | Limb et al. | 358/135 X |
| 3,769,451 | 10/1973 | Connor | 358/135 |
| 4,463,372 | 7/1984 | Bennett et al. | 358/22 |
| 4,472,732 | 9/1984 | Bennett et al. | 358/22 |
| 4,496,972 | 1/1985 | Lippmann et al. | 358/136 X |
| 4,546,386 | 10/1985 | Matsumoto et al. | 358/136 |
| 4,597,010 | 6/1986 | Carr | 358/136 |
| 4,609,941 | 9/1986 | Carr et al. | 358/136 |

OTHER PUBLICATIONS

IEEE Transactions on Acoustics, Speech, and Signal Processing, vol. ASSP-29, No. 6, Dec. 1981, "Cubic Convolution Interpolation for Digital Image Processing" (Robert G. Keys).

Primary Examiner—Michael A. Masinick
Assistant Examiner—E. Anne Faris
Attorney, Agent, or Firm—Francis I. Gray; John Smith-Hill

[57] ABSTRACT

A first pair of input data words represent two adjacent pixels on a first line of a first field of a video signal in interlaced format, a second pair of input data words represent two adjacent pixels of a first line of a second field of the video signal, and a third pair of input data words represent two adjacent pixels of a second line of the second field. The first and second lines of the second field are adjacent lines in that field and the first line of the first field is between the first and second lines of the second field. The positions on their respective lines of the pixels represented by the second and third pairs of input data words correspond to the positions on the first line of the first field of the pixels represented by the first pair of input data words. The first, second and third pairs of data words are read from memory, and are processed by interpolating among them to generate an output data word. The relative contributions to the output data word of the three pairs of input data words depend on whether an indication is provided that there is motion in the region of the frame in which the pixels represented by the second pair of input data words appear.

12 Claims, 9 Drawing Figures

INTERPOLATOR FOR TELEVISION SPECIAL EFFECTS SYSTEM

This invention relates to an interpolator for a television special effects system.

BACKGROUND OF THE INVENTION

Figure 1A:
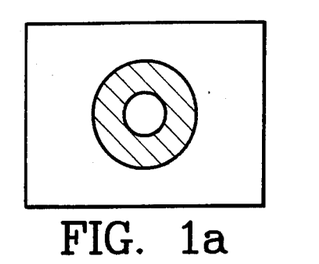
Figure 1B:
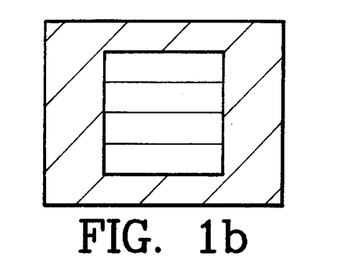
Figure 1C:
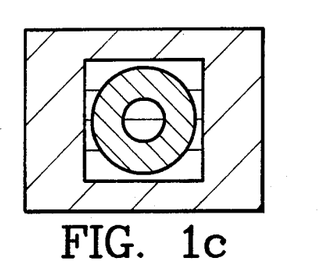

A television picture is a representation in substantially planar form of a scene that is composed by the producer of a television program. The scene may be composed of tangible objects, or it may be at least partially synthesized by artificial means, e.g. a television graphics system, so that the source of the video signal representing the scene is not a camera or a film scanner but a frame buffer and a computer used for adjusting the contents of the frame buffer. Generally, the scene is made up of two component scenes, namely a foreground scene and a background scene, that are combined using a travelling matte technique. For example, the foreground scene might contain an annulus against a solid color matte and the background scene a square against a screen of contrasting color, as shown in FIGS. 1(a) and 1(b) respectively, so that when the foreground and background scenes are combined the resulting picture has the appearance shown in FIG. 1(c).

A transform system operates on the video signal representing a scene, and may be used to carry out a spatial transformation on the scene. For example, the scene may be displaced to the right. If the foreground video signal representing the FIG. 1(a) scene is applied to a transform system which carries out a transformation on the signal such that the transformed signal represents the scene shown in FIG. 1(d), in which the annulus of the FIG. 1(a) scene has been shifted to the right, then the signal obtained by combining the transformed foreground signal with the background signal might represent the picture shown in FIG. 1(e). Most transform systems are of two main kinds, known as the forward transform system and the reverse transform system. FIG. 2 represents a frame-based reverse transform system based on principles that are known at present. It is believed that the FIG. 2 system does not exist in the prior art, and it is being described in order to provide information that will be useful in understanding the invention.

The transform system shown in FIG. 2 operates by digitizing the input video signal under control of a write clock 10 and writing the resulting sequence of digital words, each having, e.g. ten bits, into a video frame buffer 12 using addresses generated by a forward address generator 14. The input video signal is derived from an analog composite video signal in conventional interlaced format by separating it into its components (normally luminance and chrominance) and digitizing each component. The sampling rate for each of the chrominance components is only half that for the luminance component. The frame buffer 12 comprises a memory for storing the luminance component and a memory for storing the chrominance components. However, since the components are acted on in like manner in the transform system, it is not necessary to consider the components separately.

The operation of digitizing the video signal effectively resolves each raster line of the picture into multiple pixels, e.g. 720 pixels, that are small, but finite, in area. The location of a pixel in the scene can be defined by a two-coordinate display address (U, V) of the input screen (FIG. 1(a), e.g.). The address space of the video frame buffer is organized so that there is one-to-one correspondence between the display addresses and the memory addresses generated by the forward address generator 14. Thus, the digital word representing the pixel having the input scene display address (U, V) is written into the frame buffer 12 at a location that has a memory address that can be expressed as (U, V). The frame buffer is able to store a complete video frame, i.e. two interlaced fields each containing 262.5 lines in the NTSC system.

Figure 1D:
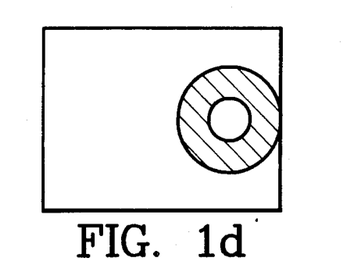
Figure 1E:
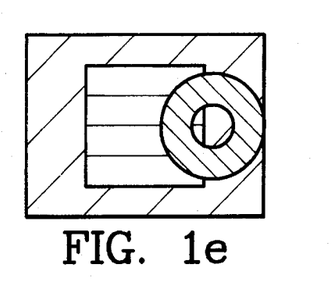
Figure 2:
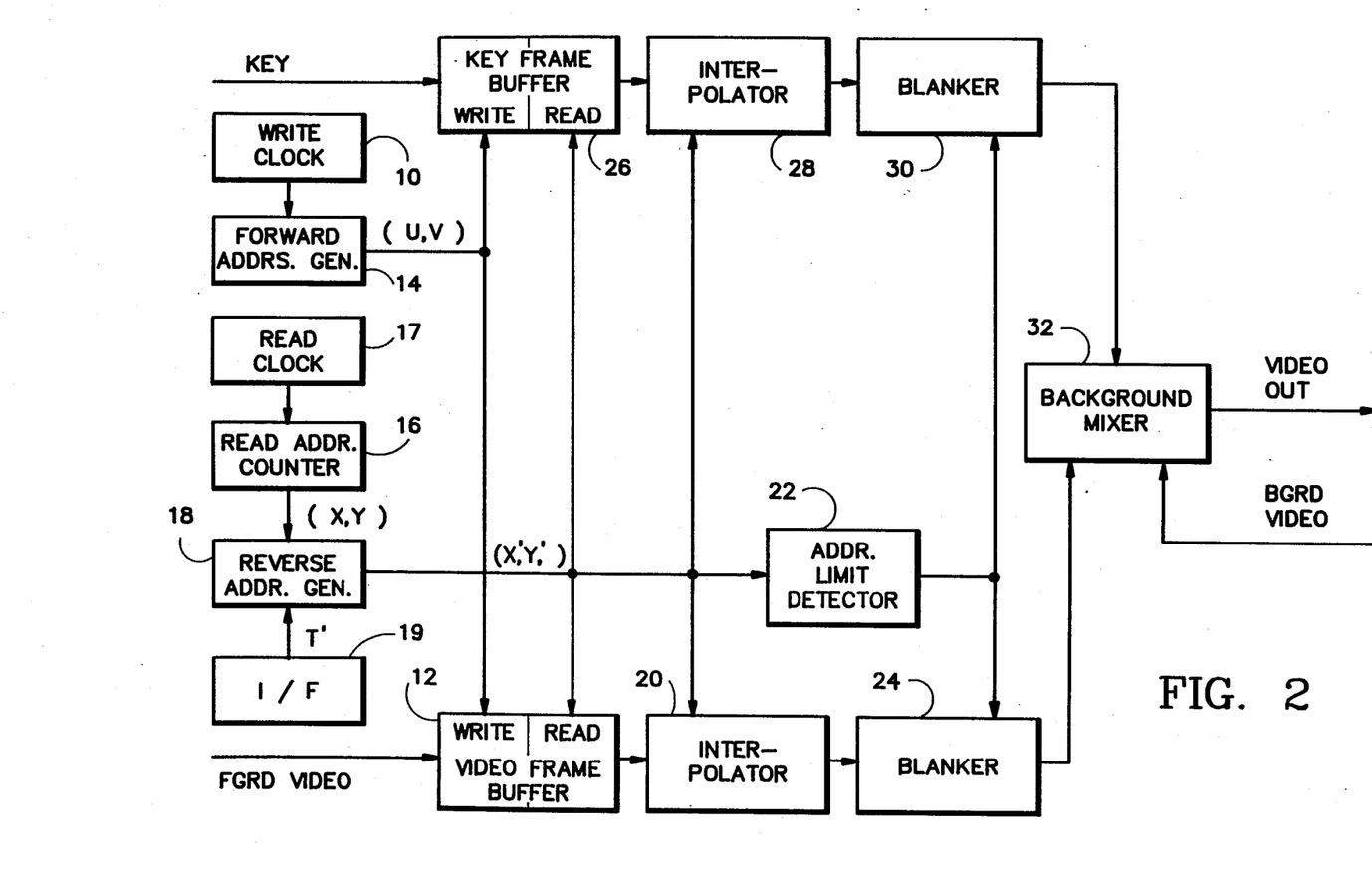
FIG. 2 is a block diagram of a reverse transform system.

In order to read an output video signal from the frame buffer 12, a read address counter 16 operates under control of a read clock 17 to generate a sequence of output scene display addresses (X, Y) defining the locations in the output screen (FIG. 1(d)) of the pixels that will be successively addressed. The coordinate values X and Y each have the same number of significant digits as the coordinate values U and V respectively. Accordingly, the display addresses (X, Y) define the same possible pixel positions in the output display space as are defined in the input display space by the display addresses (U, V). However, the display addresses (X, Y) are not used directly to read the output video signal from the frame buffer. A reverse address generator 18 receives the output scene display addresses (X, Y) and multiplies them by a transform matrix T' to generate corresponding memory addresses (X', Y') which are used to read the video signal from the frame buffer. The transform matrix T' is applied to the reverse address generator 18 by a user interface 19, and defines the nature of the transform that is effected by the reverse transform system. If, for example, it is desired to effect a transformation in which the input scene is displaced diagonally upwards and to the left by an amount equal to the inter-pixel pitch in the diagonal direction, the transform matrix would be such that the memory address (X', Y') that is generated in response to the display address (X, Y) would be (X+1, Y+1), assuming that the origin of the coordinate system is in the upper left corner of the input and output scene, and values of X and Y increase to the right and downwards respectively.

In the general case, it is not sufficient for the values of X' and Y' to be related to X and Y by addition or subtraction of integers, and therefore the memory address coordinates X' and Y' have more significant digits than the display address coordinates X and Y. The reverse addresses are applied not only to the frame buffer 12 but also to a video interpolator 20. For each reverse address (X', Y'), the frame buffer outputs the respective digital words representing an array of pixels surrounding the position defined by the reverse address (X', Y'). For example, the data words representing the four pixels nearest the point defined by the address (X', Y') might be provided. These four data words are applied to the interpolator 20, and the interpolator combines these four digital words into a single digital output word based on the fractional portion of the address (X', Y'). For example, using decimal notation, if the least significant digit of each coordinate X and Y is unity but the least significant digit of the coordinates X' and Y' is one-tenth, and the counter 16 generates the read address (23, 6) which is converted to a reverse address (56.3, 19.8) by being multiplied by the transform matrix T', the frame buffer 12 might respond to the reverse address (56.3, 19.8) by providing the digital words stored at the addresses (56, 19), (56, 20), (57, 19) and (57, 20). The interpolator 20 combines these four words into a single digital output word by weighting them 3:7 in the horizontal direction and 8:2 in the vertical direction. This digital word defines the value that is to be generated at the location of the output screen that is defined by the display address (23, 6). In a conventional frame-based machine known as the ADO (Ampex Digital Optics) the transformation and interpolation are not performed two-dimensionally but in two distinct one-dimensional steps. Thus, the input signal is applied to a first corner-turning memory and the signal that is read out is transformed vertically relative to the input signal and is interpolated vertically, and the vertically transformed and interpolated signal is applied to a second corner-turning memory. The output signal of the second memory is transformed horizontally relative to the input signal and is interpolated horizontally.

The range of possible reverse addresses is greater than the range of memory addresses defining locations in the frame buffer 12, so that a validly-generated reverse address might define a location that does not exist in the frame buffer's address space. Therefore, the reverse addresses are also applied to an address limit detector 22 which responds to an invalid reverse address (an address which defines a location outside the address space of the frame buffer 12) by providing a signal which causes a video blanker 24 to inhibit the output signal of the frame buffer.

In parallel with the video channel comprising the video frame buffer 12, the video interpolator 20 and the video blanker 24 is a key channel comprising a key frame buffer 26, a key interpolator 28 and a key blanker 30. A key signal that is applied to the key channel provides opacity information about the foreground video signal applied to the video channel. This opacity information defines where and the extent to which a background scene represented by a background video signal can be seen in a composite picture (FIG. 1(c)) formed by mixing the foreground and background video signals under the influence of the key signal. Outside the boundaries of the foreground objects, the foreground scene is transparent (key=0) and the background scene is seen without modification by the foreground scene. If a foreground object is fully opaque (key=1), the background scene is fully obscured by the foreground object, but if a foreground object is only partially transparent (0<key<1) the background video signal is mixed with the foreground video signal in proportion to the value of the key. Because the foreground scene is transformed by the video channel, it is necessary to transform the key in the identical manner in order to maintain congruence between the foreground scene and the key. Therefore, the key signal is processed in the key channel in the same way as the foreground signal is processed in the video channel. Thus, the key signal undergoes the same spatial transformation and interpolation as the foreground signal, and is subject to the same address limit blanking.

The transform matrix T' must be the mathematical inverse of the desired spatial transform T, and it is for this reason that the reverse transform system is known as such.

The four digital words among which interpolation is carried out by the interpolator 20 comprise two digital words on one line of the video frame and two digital words on an adjacent line of the frame. Because the analog composite video signal from which the input digital video signal was derived is in interlaced format and therefore the frame is composed of two interlaced fields, the two lines represent the input scene at two different times.

SUMMARY OF THE INVENTION

In a preferred embodiment of the present invention, a first pair of input data words representing two adjacent pixels on a first line of a first field of a video signal in interlaced format, a second pair of input data words representing two adjacent pixels on a first line of a second field of the video signal (the second field occurring immediately after the first field) and a third pair of input data words representing two adjacent pixels on a second line of the second field, where the second line is adjacent the first line in the second field and the first line of the first field is between the first and second lines of the second field, are read from a frame buffer. The positions on the respective lines of the pixels represented by the second and third pairs of data words correspond to the positions on the first line of the first field of the pixels represented by the first pair of input data words. The input data words are processed so as to generate an output data word representing a target point lying within the boundary defined by the pixels represented by the first and third pairs of input data words, by interpolating among the data words of the three pairs. The relative contributions to the output data word of the three pairs of input data words depend on whether motion from frame to frame of the video signal is indicated.

In the preferred embodiment, the data words of the first, second and third pairs are interpolated with data words of a fourth pair if motion is not indicated. The data words of the fourth pair represent two adjacent pixels on a second line of the first field, the first line of the first field being between the first and second lines of the second field, and the target point lies within the boundary defined by the pixels represented by the first and third pairs of data words. The pixels represented by the fourth pair of input data words are at positions on the second line of the first field corresponding to the positions of the pixels represented by the data words of the first pair. If motion is not indicated, the relative contributions of the four pairs of data words to the output data word depend on the position of the target point. If motion is indicated, the first and fourth pairs of input data words do not contribute to the output data word, and the relative contributions of the second and third pairs depend on the position of the target point.

In another embodiment, only the first, second and third pairs of data words are made available. If motion is not indicated, the second pair of data words do not contribute to the output data word, and the contributions of the first and third pairs depend on the position of the target point. If motion is indicated, the first pair of input data words do not contribute to the output data word, and the contributions of the second and third pairs depend on the position of the target point. Thus, in each case two pairs of input data words are used to generate the output data word by interpolating both horizontally and vertically.

BRIEF DESCRIPTION OF THE DRAWINGS

For a better understanding of the invention, and to show how the same may be carried into effect, reference will now be made, by way of example, to the accompanying drawings in which:

FIG. 1(a–e) is a series of screens illustrating transformation of a foreground scene.

DETAILED DESCRIPTION

Figure 4:
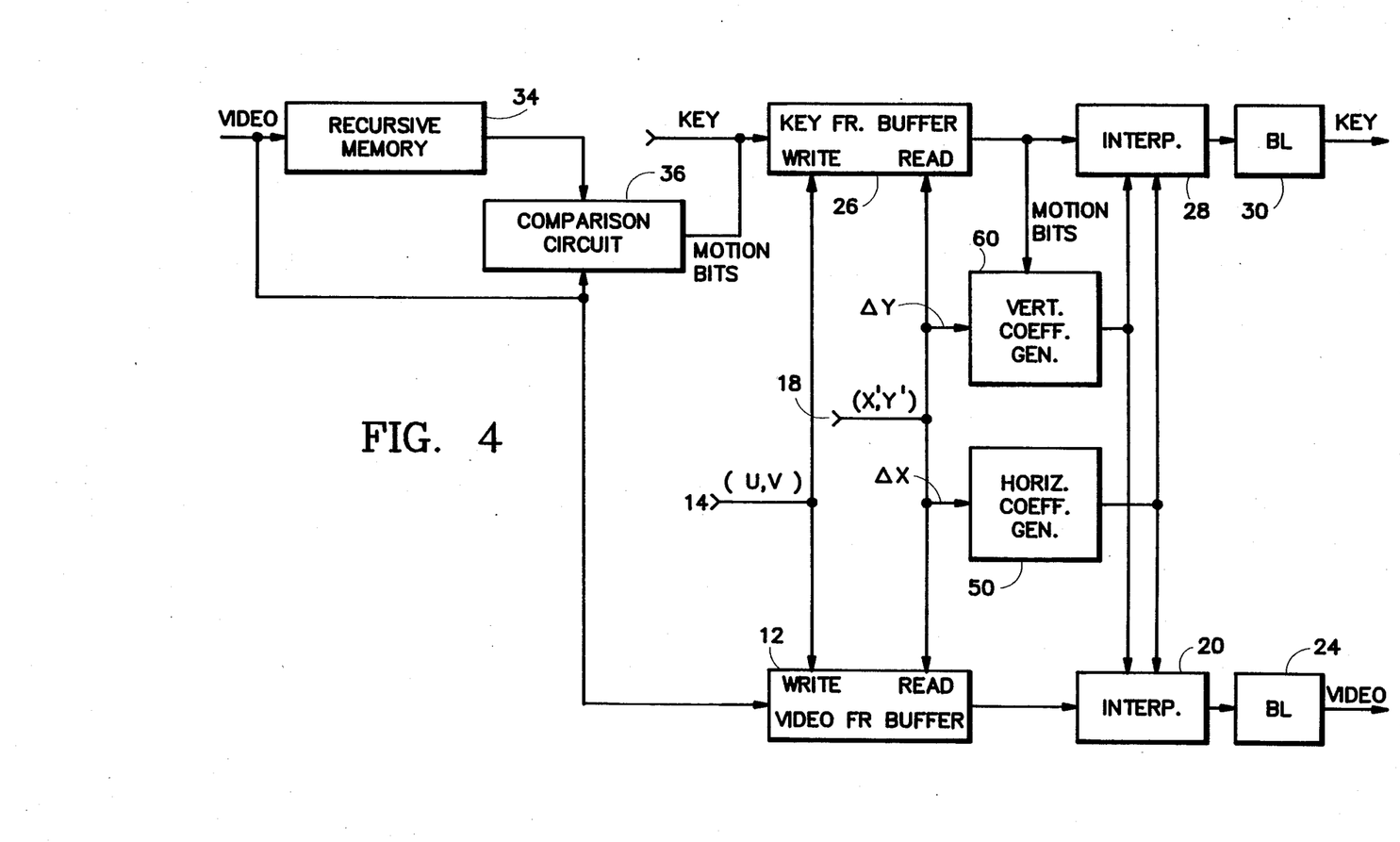
FIG. 4 is a block diagram of a modified form of the reverse transform system.

The special effects system shown in FIG. 4 includes a recursive memory 34 that is located upstream of the video frame buffer 12. The video signal is written into the recursive memory concurrently with its being written into the video frame buffer. As each data word, representing a pixel of the input scene, is applied to the frame buffer 12, the word stored in the memory 34 and representing that same pixel in the previous frame of the video signal is read from the memory 34 and is compared using known techniques with the word being applied to the frame buffer 12. The comparison takes place in a comparison circuit 36. If the two words are the same, within a predetermined tolerance, the comparison circuit 36 provides a digital zero at its output. If the words are not the same within the predetermined tolerance, the comparison circuit provides a digital one at its output. The output signal of the comparison circuit 36 indicates whether there is motion between frames of the video signal and progresses through the special effects system with the key signal.

Figure 3:
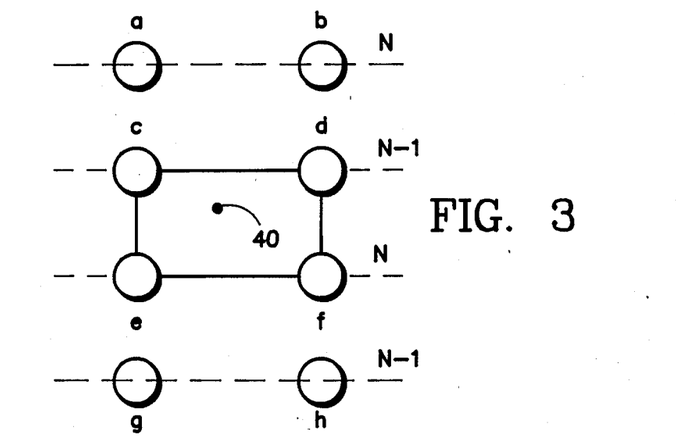
FIG. 3 illustrates diagrammatically a portion of an input scene.
Figure 5:
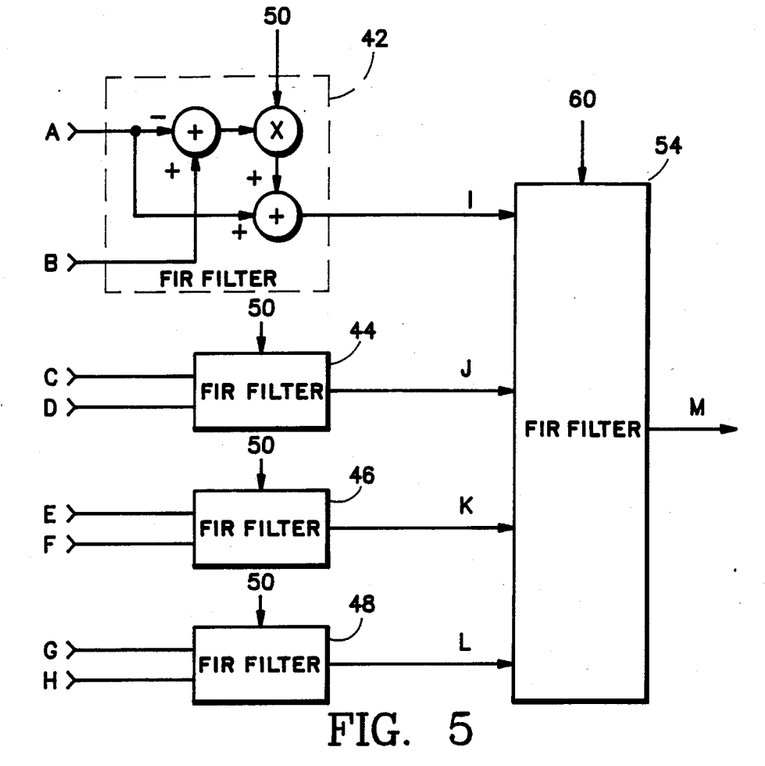
FIG. 5 is a block diagram of a component of the FIG. 4 reverse transform system.

The contents of the frame buffer 12 represent a rectangular array of pixels, containing 480 rows of 720 pixels each. A subset of these pixels is shown in FIG. 3, which illustrates a pixel matrix comprising four pixels a, b, e and f that occur on field N of an interlaced video signal and four pixels c, d, g and h that occur on the previous field (field N−1) of the video signal. If the address (X', Y') provided by the reverse address generator identifies the point 40 in FIG. 3, then a data word representing the color at the point 40 is synthesized from the data words representing the pixels a–h. This synthesized data word is used to generate the pixel at the location in the output scene having the address (X, Y) which, on transformation, yielded the address (X', Y'). If, for example, the address (X, Y) represents the location in the output scene that corresponds to the location of the pixel a in the input scene, the transformation has the effect of displacing the input scene upwards and to the left in order to produce the output scene. The data word representing the color at the point 40 is synthesized using the apparatus illustrated in FIG. 5. The FIG. 5 apparatus comprises four two-point FIR (finite impulse response) digital filters 42, 44, 46 and 48. Each filter receives at its input terminals the data words representing the pixels on one of the lines of the pixel matrix shown in FIG. 3. Thus, for example, the filter 42 receives the data words representing the pixels a and b. Each filter also receives, from a horizontal coefficient generator 50, a weighting coefficient. Normally, the four coefficients provided to the filters 42, 44, 46 and 48 would be the same and would be equal to $\Delta X/X_o$, where $X_o$ is the inter-pixel pitch in the horizontal direction and $\Delta X$ is the distance in the horizontal direction of the point 40 from the column containing the pixels a, c, e and g, i.e. the fractional portion of the horizontal address word X'. The filter 42, which is shown in more detail than the filters 44, 46 and 48, generates an output word having the value I given by $$I = A = \Delta X (B-A)/X_o$$

where A and B are the values of the data words representing the pixels a and b respectively. The filters 44, 46 and 48 perform analogous operations on the data words C, D; E, F and G, H that they receive from the frame buffer, representing the pixels c, d; e, f and g, h, respectively, and generate data words J, K and L respectively. It will be appreciated that each of the filters 42, 44, 46 and 48 performs a linear interpolation.

The data words I, J, K and L provided by the filters 42, 44, 46 and 48 are applied to a four-point FIR filter 54 which receives coefficients generated by a vertical coefficient generator 60. The vertical coefficient generator receives a first input signal representative of the vertical distance $\Delta Y$ between the line containing the pixels c and d and the point 40, i.e. the fractional portion of the vertical address word Y', and a second input signal comprising the four bit motion signal provided by the comparison circuit 36 for the pixels a, b, e and f. The coefficient generator 60 has two operating states (the motion state and the non-motion state). In the motion state, the coefficients provided by the vertical coefficient generator 60 are such that the words J and L do not contribute to the data word M provided by the filter 54, the word M being a linear interpolation between the words I and K. On the other hand, in the non-motion state, the coefficients provided by the coefficient generator 60 cause the filter 54 to execute a full four-point filtering operation. If all four bits of the motion signal are zero indicating that fields N and N−1 are the same in the region of the input matrix, the vertical coefficient generator 60 is placed in the non-motion state, whereas if at least one bit is one, indicating that there is a difference between fields N and N−1 in the region of the input matrix, the vertical coefficient generator is placed in the motion state. In this manner, the motion signal determines the relative weighting in the data word M of the video information in the most recent field (field N), and the video information in the previous field (field N−1).

The two-dimensional interpolation operation is carried out for each pixel location in the output scene. Thus, if there are some addresses (X, Y) for which the motion signal indicates motion and others for which the motion signal indicates no motion, the interpolation operations for the two sets of addresses are different.

It will be understood by those skilled in the art that a two-point digital FIR filter conventionally comprises a delay line, two multipliers connected to the input and output respectively of the delay line, and a summation circuit for adding the outputs of the multipliers. A stream of input data words is applied to the input of the filter, the interval between words being equal to the delay of the delay line. The delay line brings each two consecutive input words into coincidence, and in response to each two consecutive input words the summation circuit provides an output word that is a weighted average of the input words. Although the filter 42, for example, is not shown as including a delay line, it nevertheless functions as a FIR filter because the words A and B represent the value of the video signal at different sample times. The words A and B are brought into coincidence before they are applied to the filter, e.g. by latching them into registers after reading from the frame buffer, and are then applied to the filter simultaneously.

The coefficients that are generated by the vertical coefficient generator 60 when in the non-motion mode are computed on the basis of the principles described in R. G. Keys, "Cubic Convolution Interpolation for Digital Image Processing," IEEE Trans. Acoust., Speech, Signal Processing, vol. ASSP-29, December 1981, pp. 1153–1160.

By using both fields stored in the video frame buffer 12 to generate each output field (when the vertical coefficient generator is in its non-motion state) improved vertical resolution is obtained as compared with a system in which the output field is generated from a single input field because the data base from which each pixel in the output field is generated is twice as large. In the motion state, each field of the output signal is generated from the more recent of the two fields stored in the frame buffer and therefore the impression of motion is not degraded due to contamination of the output signal with information derived from the less recent field.

At the time illustrated in FIG. 3, the pixels a, b, e and f are in the more recent field and the pixels c, d, g and h are in the less recent field. In the next field, the pixels c, d, g and h will be in the more recent field and the pixels a, b, e and f in the less recent, and in the event that motion is indicated the output words I and K will not contribute to the output data word, which will be a linear interpolation between the two words J and L. Therefore, the reverse transform system's controller (not shown) provides the vertical coefficient generator 60 with information regarding the field currently being read, and the coefficient generator 60 uses that information in order to determine whether to use the words I and K or J and L to generate the output word M in the event that motion is indicated.

It will be appreciated that the present invention is not restricted to the particular embodiment that has been described, and that variations may be made therein without departing from the scope of the invention as defined in the appended claims and equivalents thereof. For example, in a simplified form of the interpolator the output data word is generated from only four input data words in the non-motion state as well as the motion state. In the non-motion state, the output data word representing the pixel at the point 40 would be synthesized from the data words C, D, E and F, and in the motion state the output data word would be synthesized from the words A, B, E and F. It is, however, preferred that at least four pairs of pixels be employed. Of course, the invention is not restricted to use of only four pairs of pixels, and it would be possible by using four-point FIR filters in lieu of the two-point filters 42–48 to generate the output word from a matrix of 16 pixels.

The invention is not restricted to the case in which the digital video signal is in luminance and chrominance component form and is derived from an analog composite signal, since the signal may be received in component form (analog or digital) and processed in other than luminance and chrominance component form.

The invention is not restricted to the the vertical coefficient generator 60 having just two operating states. The vertical coefficient generator may have several different operating states, of which one is selected in dependence upon the nature of the motion signal, which may be of more than four bits.

We claim:

1. A method of processing a first pair of input data words representing two adjacent pixels on a first line of a first field of a video signal in interlaced format, a second pair of input data words representing two adjacent pixels of a first line of a second field of the video signal, said second field being the field that occurs immediately after said first field, and a third pair of input data words representing two adjacent pixels of a second line of the second field, where the first and second lines of the second field are adjacent lines in that field and the first line of the first field is between the first and second lines of the second field, the positions on their respective lines of the pixels represented by the second and third pairs of input data words corresponding to the positions on the first line of the first field of the pixels represented by the first pair of input data words, and the method comprising reading the first, second and third pairs of data words from memory, providing an indication of whether motion is present in the region of the frame in which the pixels represented by the second pair of input data words appear, and interpolating among the input data words of the first, second and third pairs to generate an output data word, the relative contributions to the output data word of the three pairs of input data words being dependent upon whether motion is indicated.

2. A method according to claim 1, wherein the contribution of the first pair of input data words to the output data word is zero when motion is indicated.

3. A method according to claim 1, wherein the contribution of the second pair of input data words to the output data word is zero when motion is not indicated and the contribution of the first pair of input data words to the output data word is zero when motion is indicated.

4. A method according to claim 1, wherein the first, second and third pairs of input data words are interpolated with a fourth pair of input data words to generate the output data word, the fourth pair of data words representing two adjacent pixels on a second line of the first field of the video signal, the first and second lines of the first field being adjacent one another in the first field and the second line of the second field being between the first and second lines of the first field, and the pixels represented by the fourth pair of input data words being at positions on the second line of the first field corresponding to the positions on the first line of the first field of the pixels represented by the first pair of input data words.

5. A method according to claim 4, comprising interpolating between the data words of the first pair of input data words to generate a first intermediate data word, interpolating between the data words of the second pair of input data words to generate a second intermediate data word, interpolating between the data words of the third pair of input data words to generate a third intermediate data word and interpolating between the data words of the fourth pair of input data words to generate a fourth intermediate data word, and carrying out a finite inpulse response filtering operation among the first, second, third and fourth intermediate data words in order to generate the output data word.

6. A method according to claim 5, wherein, in the event that motion is indicated, the finite impulse response filtering operation is a linear interpolation between the second and fourth intermediate data words.

7. A method of processing a video signal in interlaced format, comprising writing first, second and third pairs of input data words representing respective pixels in a frame of the video signal into memory, the pixels represented by the first pair of input words being adjacent pixels on a first line of a first field of the video signal, the pixels represented by the second pair of input words being two adjacent pixels on a first line of a second field of the video signal, the second field being the field that occurs immediately after the first field, and the third pair of input words representing adjacent pixels on a second line of second field, where the first and second lines of the second field are adjacent lines in that field and the first line of the first field is between the first and second lines of the second field, the positions on their respective lines of the pixel represented by the second and third pairs of input words corresponding to the positions on the first line of the first field of the pixels represented by the first pair of input words, and the method also comprising reading the first, second and third pairs of input words from memory, obtaining an indication of whether motion is present in the region of the frame in which the pixels represented by the second pair of input data words appear, and interpolating among the input words of the first, second and third pairs to generate an output word, the relative contributions to the output word of the three pairs of input words being dependent upon whether motion is indicated.

8. A method of processing a first pair of input data words representing two adjacent pixels on a first line of a first field of a video signal in interlaced format, a second pair of input data words representing two adjacent pixels of a first line of a second field of the video signal, said second field being the field that occurs immediately after said first field, and a third pair of input data words representing two adjacent pixels of a second line of the second field, where the first and second lines of the second field are adjacent lines in that field and the first line of the first field is between the first and second lines of the second field, the positions on the second line of the second field of the pixels represented by the third pair of input data words corresponding to the positions on the first line of the second field of the pixels represented by the second pair of input data words, and the positions on the first line of the first field of the pixels represented by the first pair of input data words each being within one inter-pixel pitch of the positions on the first line of the second field of the pixels represented by the second pair of input data words, the method comprising reading the first, second and third pairs of data words from memory, providing an indication of whether motion is present in the region of the frame in which the pixels represented by the second pair of input data words appear, and interpolating among the input data words of the first, second and third pairs to generate an output data word, the relative contributions to the output data word of the three pairs of input data words being dependent upon whether motion is indicated.

9. Apparatus for processing first, second and third pairs of input data words representing respective pixels within a frame of a video signal in interlaced format, the pixels represented by the first pair of input data words being adjacent pixels on a first line of a first field of the video signal, the pixels represented by the second pair of input data words being adjacent pixels on a first line of a second field of the video signal said second field being the field that occurs immediately after said first field, and the third pair of input data words representing adjacent pixels on a second line of the second field, where the first and second lines of the second field are adjacent lines in that field and the first line of the first field is between the first and second lines of the second field, the positions on the respective lines of the pixels represented by the second and third pairs of input data words corresponding to the positions on the first line of the first field of the pixels represented by the first pair of input data words, the apparatus comprising means for providing an indication of whether there is motion present in the region of the frame in which the pixels represented by the second pair of input data words appear, interpolator means for interpolating among the first, second and third pairs of input data words to generate an output data word, and adaptive means for adjusting the relative contribution to the output data word of the three pairs of input data words in dependence upon whether motion is detected.

10. Apparatus according to claim 9, comprising means for identifying a target point in a scene represented by the video signal, said point lying within a boundary defined by the pixels represented by the first and third pairs of data words, and wherein the adaptive means comprises means for generating interpolation coefficients having values dependent upon the position of the target point within the boundary.

11. Apparatus according to claim 10, wherein the interpolator means comprises first, second, third and fourth finite impulse response filters for receiving the first, second and third pairs of input data words and a fourth pair of input data words respectively and interpolating between each pair to provide first, second, third and fourth intermediate data words, and fifth finite impulse response filter for interpolating among the first, second, third and fourth intermediate data words to generate the output data word.

12. Apparatus according to claim 11, wherein the adaptive means comprises a first coefficient generator for receiving information regarding the position of the target point in a direction parallel to the lines of the first and second fields and generating an interpolation coefficient that is applied to the first, second, third and fourth filters, and a second coefficient generator for receiving information regarding the position of the target point in a direction perpendicular to the lines of the first and second fields and generating interpolation coefficients that are applied to the fifth filter.

* * * * *

UNITED STATES PATENT AND TRADEMARK OFFICE
CERTIFICATE OF CORRECTION

PATENT NO. : 4,700,232

DATED : October 13, 1987

INVENTOR(S) : John Abt and Richard A. Jackson

It is certified that error appears in the above—identified patent and that said Letters Patent is hereby corrected as shown below:

Col. 6, line 4 change "$I=A=\Delta X(B-A)/X_o$" to

--$I=A+\Delta X(B-A)/X_o$--

Signed and Sealed this

Twenty-sixth Day of April, 1988

Attest:

DONALD J. QUIGG

Attesting Officer

Commissioner of Patents and Trademarks